United States Patent [19]

Eriksson

[11] Patent Number: 4,668,389
[45] Date of Patent: May 26, 1987

[54] CLEANING DEVICE ARRANGED IN FRONT OF THE INLET TO A WATERWAY

[76] Inventor: Hans Eriksson, Nygatan 11, 681 00 Kristinehamn, Sweden

[21] Appl. No.: 702,237
[22] PCT Filed: May 3, 1984
[86] PCT No.: PCT/SE84/00163
    § 371 Date: Jan. 25, 1985
    § 102(e) Date: Jan. 25, 1985
[87] PCT Pub. No.: WO84/04743
    PCT Pub. Date: Dec. 6, 1984

[51] Int. Cl.$^4$ ............................................. C02F 9/00
[52] U.S. Cl. ..................................... 210/155; 210/924
[58] Field of Search ............... 210/663, 669, 671, 680, 210/693, 154, 155, 162, 170, 924, 242.4

[56] References Cited

U.S. PATENT DOCUMENTS

| | | | |
|---|---|---|---|
| 2,961,710 | 11/1960 | Stark | 18/48 |
| 2,996,189 | 8/1961 | Salterbach | 210/155 |
| 3,702,657 | 11/1972 | Cunningham et al. | 210/924 |
| 3,756,948 | 9/1973 | Weinberg | 210/693 |
| 4,052,306 | 10/1977 | Schwartz et al. | 210/924 |
| 4,059,528 | 11/1977 | Grosshandler | 210/924 |
| 4,183,984 | 1/1980 | Browers et al. | 210/242.4 |
| 4,190,381 | 2/1980 | Knaus et al. | 405/72 |
| 4,197,204 | 4/1980 | Mathes | 210/924 |
| 4,601,825 | 7/1986 | Eriksson | 210/287 |

FOREIGN PATENT DOCUMENTS 76891 4/1983 European Pat. Off. .
403152 7/1978 Sweden .

OTHER PUBLICATIONS

Derwent Abstract No. B 6641 B/08, USSR 601-346.

*Primary Examiner*—Ivars Cintins
*Attorney, Agent, or Firm*—Dennison, Meserole, Pollack & Scheiner

[57] ABSTRACT

Excessive oil contamination creates difficulties for water entering waterways. The invention reduces these difficulties by causing the water to flow through three passages on its way to the inlet, the first passage comprising an oil barrier having a net stretching from the surface of the water, preferably down to the bottom of the waterway, the second comprising a filter cloth with a mesh size between 0.2 and 2 mm$^2$ and the third comprising a filter formed of particles with closed cells which have been perforated.

1 Claim, 1 Drawing Figure

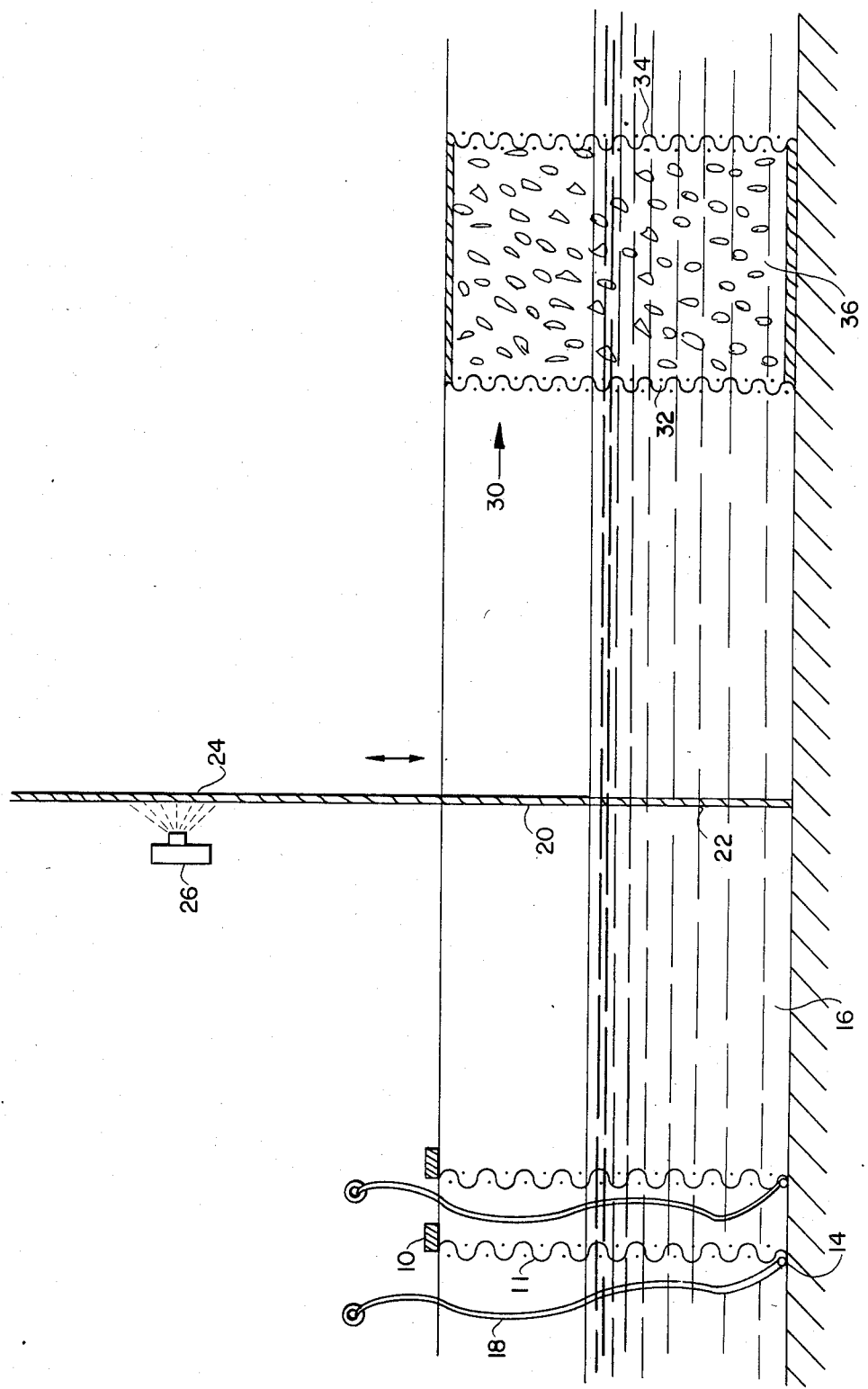

CLEANING DEVICE ARRANGED IN FRONT OF THE INLET TO A WATERWAY

Sea-water is used for various purposes. In most cases it must be cleaned from particles. One example is the considerable discharge of crude oil from leaking Iranian production wells. Oil units of various sizes threaten, for instance, production in desalination installations and power plants as well as water inlets for pumping down into oil-conducting formations with the object of maintaining the pressure. Coasts where oil production or loading and unloading from ships is carried out are subjected not only to the risk of shipping accidents, but also to constant oil spills from normal activities.

Scientific literature relating to the behaviour of oil is for the most part pragmatic, i.e. it describes oil discharges which have occurred and the measures, often improvised, taken to combat them. The behaviour of the oil is dependent on the chemical composition of the specific oil and water concerned and on temperature, water movement, etc. In general, part is volatilized, a second part may float on the surface of the water for some time, while a third part forms accumulations floating at various depths in the water depending on slight alterations in the density of the oil and the water. These accumulations are usually washed ashore on beaches or sink to the bottom and may remain for many years. If they have settled on the bottom in relatively shallow water, they can be broken up or set in motion by movements in the water. According to the present invention oil is combatted in three steps.

The drawing FIGURE illustrates schematically, in longitudinal cross-section, the apparatus for carrying out the three steps of the invention.

The first protective step comprises oil barriers 10 from which nets 11, 12 of varying mesh sizes are suspended so that the lowermost part 14 of the net rest on the bottom of inlet 16. The net is provided with a rope 18 at the lower end, enabling it to be raised to the surface in the form of a sack with the object of facilitating the removal of oil lumps caught there. More than one such barrier may be necessary.

Small particles are able to pass through the net or nets and such particles may differ in consistency and size depending on the circumstances mentioned above affecting the accumulation of the oil. In general, extremely small particles are unlikely to occur at the depths where water is drawn in unless extraordinary winds prevail. A filter cloth 20 with sufficiently fine mesh should in most cases be able to catch particles which have passed through the nets. The mesh size to be used is a question of optimization taking into consideration the behaviour of the oil in the specific circumstances and the pressure drop which can be accepted. Filter cloths with various mesh sizes can be kept in reserve for special situations. Suitable mesh size may vary from 0.2 to 2 $mm^2$.

The filter is movable in the direction of the arrows so that its lower part 22 covers the area of the inlet channels or tubes. Its upper part 24 is drawn over a washing device 26 where the filter is cleared from particles with the aid of water, steam or compressed air. The part of the filter cloth immersed in the water is inclined to facilitate attraction of the particles or is provided with special sweepers. Scrapers may be used before washing. The motion of the cloth is adjusted to the quantity of particles in the water. A filter of this design may also collect particles other than oil accumulations.

Should liquid oil or extremely small particles pass through the filter cloth, a third cleaning step may be introduced in the form of a filter as described in Swedish patent application No. 8301243-5, which corresponds to U.S. application Ser. No. 673,746, filed Nov. 8, 1984, now U.S. Pat. No. 4,601,825 which discloses a filter for separating oil from water including a closed cell polymer foam, in which the cells have been perforated.

Such a filter is shown as unit 30 in the drawing FIGURE and includes an inflow wall 32 and an outflow wall 34, which walls may comprise a wire netting or perforated sheet metal. Water entering the filter unit flows through a plurality of filter cushions 36, each including units of a closed cell polymer foam in which the cells have been perforated, the units being encased in a net-like fabric in order to form the cushions.

I claim:

1. Cleaning device to be placed in front of an inlet to a waterway for filtering oil from water entering the waterway, comprising:
   (a) a first passage for the water including an oil barrier comprising a net stretching from the surface of the water down to the bottom of the water, said net arranged so as to form a sack when lifted up from the bottom;
   (b) a second passage for the water including a movable filter cloth having a mesh size between 0.2 and 2 $mm^2$; and
   (c) a third passage for the water including a filter formed of particles of a closed cell foam polymer in which the cells have been perforated.

* * * * *